(12) United States Patent
Huang

(10) Patent No.: US 12,119,728 B2
(45) Date of Patent: Oct. 15, 2024

(54) CANNED MOTOR DEVICE

(71) Applicant: ZI YI ELECTRICAL ENGINEERING CO., LTD., Taichung (TW)

(72) Inventor: Ting-Tsai Huang, Taichung (TW)

(73) Assignee: ZI YI ELECTRICAL ENGINEERING CO., LTD., Taichung (TW)

( * ) Notice: Subject to any disclaimer, the term of this patent is extended or adjusted under 35 U.S.C. 154(b) by 317 days.

(21) Appl. No.: 17/583,532

(22) Filed: Jan. 25, 2022

(65) Prior Publication Data
US 2023/0238854 A1 Jul. 27, 2023

(51) Int. Cl.
H02K 5/18 (2006.01)
H02K 5/10 (2006.01)
H02K 9/06 (2006.01)

(52) U.S. Cl.
CPC ............... H02K 5/18 (2013.01); H02K 5/10 (2013.01); H02K 9/06 (2013.01)

(58) Field of Classification Search
CPC .......... H02K 9/223; H02K 5/04; H02K 5/128; H02K 5/16; H02K 5/18
USPC .. 310/52, 85, 86, 87, 88, 89, 406, 407, 408; 277/382, 472, 590, 574
See application file for complete search history.

(56) References Cited

U.S. PATENT DOCUMENTS

| | | | | |
|---|---|---|---|---|
| 8,368,265 B2 * | 2/2013 | Owng | ...... | H02K 9/14 310/60 A |
| 11,196,321 B2 * | 12/2021 | Huang | ...... | H02K 5/18 |
| 2005/0099075 A1 * | 5/2005 | Roslund | ...... | F02C 7/236 310/85 |
| 2007/0052309 A1 * | 3/2007 | Spaggiari | ...... | H02K 5/10 310/85 |
| 2010/0171380 A1 * | 7/2010 | De Filippis | ...... | H02K 3/522 310/52 |

FOREIGN PATENT DOCUMENTS

| | | | | |
|---|---|---|---|---|
| CN | 108365691 A | * | 8/2018 | ...... H02K 5/04 |
| KR | 20050105138 A | * | 10/2005 | ...... H02K 5/18 |

OTHER PUBLICATIONS

Kim, "Vacuum Sealing Structure of Motor", 2005, English Machine Translated (Year: 2005).*
Liang, "A Motor End Cover and Motor Using the Same", 2018, English Machine Translated (Year: 2018).*

* cited by examiner

Primary Examiner — Christopher M Koehler
Assistant Examiner — Theodore L Perkins
(74) Attorney, Agent, or Firm — Lando & Anastasi, LLP

(57) ABSTRACT

A canned motor device includes a base, a fixed seat, a motor unit, a motor cover and a main cover. The base is formed in a shape of a hollow cylinder that surrounds an axis, and defines an accommodating space in which the fixed seat is disposed. The motor unit includes a stator, a rotor and an impeller. The motor cover is disposed on the base and covers the impeller. The main cover is located at one side of the base opposite to the motor cover along the axis, and has an inner surface, an annular protrusion that protrudes from the inner surface and that has an annular end surface, and an inner heat-dissipating space that is defined by the inner surface and the annular protrusion and that is adjacent to the stator.

4 Claims, 5 Drawing Sheets

CANNED MOTOR DEVICE

FIELD

The disclosure relates to a canned motor device, and more particularly to a canned motor device with enhanced heat-dissipation efficiency.

BACKGROUND

A conventional canned motor device disclosed in Taiwanese Patent No. M577069 includes a base, a fixed seat, a motor unit, a motor cover and a heat-dissipating cover. The base is made of plastic materials, and includes a covering member and a main body member that has an inner annular surface surrounding an axis to define a mounting space. The fixed seat is made of metal materials, is formed in a shape of a hollow cylinder that surrounds the axis, is mounted within the mounting space, and has an outer annular surface that abuts against the inner annular surface of the base. The motor unit includes a case body, a stator, a rotor and an impeller. The case body is disposed on the base. The stator is sleeved on the case body and is disposed within the mounting space. The rotor is disposed within the case body. The impeller is connected to the rotor. The motor cover is disposed on the base and covers the impeller. The heat-dissipating cover is disposed on the covering member of the base. The fixed seat and the motor unit are positioned relative to the base along the axis by the heat-dissipating cover.

Because the fixed seat is made of metal materials, the fixed seat has relatively high structural strength and is capable of withstanding heat generated by the stator during operation. However, while having good heat resistance is beneficial, effectively dissipating the heat can also be very advantageous.

SUMMARY

Therefore, an object of the disclosure is to provide a canned motor device that can achieve at least one more effect than the prior art.

According to the disclosure, the canned motor device includes a base, a fixed seat, a motor unit, a motor cover and a main cover. The base is formed in a shape of a hollow cylinder that surrounds an axis, and defines an accommodating space. The fixed seat is formed in a shape of a hollow cylinder that surrounds the axis, and is disposed in the accommodating space. The motor unit includes a case body, a stator, a rotor and an impeller. The case body is disposed on the base. The stator is sleeved on the case body and is surrounded by the fixed seat. The rotor is disposed in the case body. The impeller is connected to the rotor. The motor cover is disposed on the base and covers the impeller. The main cover is located at one side of the base opposite to the motor cover along the axis, and has an inner surface, an annular protrusion and an inner heat-dissipating space. The inner surface abuts against the base. The annular protrusion protrudes from the inner surface, and has an annular end surface that is spaced apart from the inner surface and that airtightly abuts against the fixed seat. The inner heat-dissipating space is defined by the inner surface and the annular protrusion, and is adjacent to the stator of the motor unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
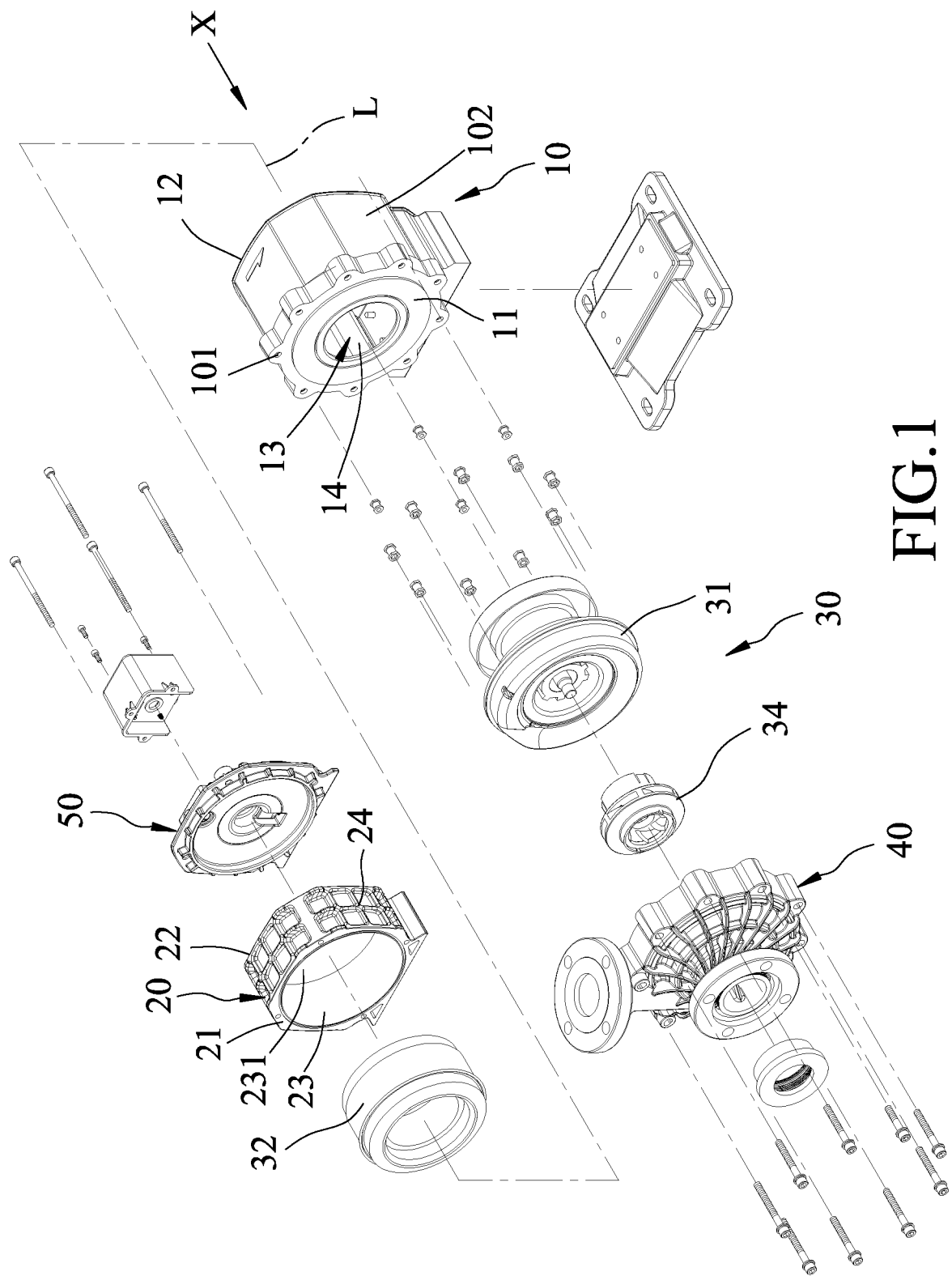
FIG. 1 is an exploded perspective view of an embodiment of a canned motor device according to the disclosure.
Figure 2:
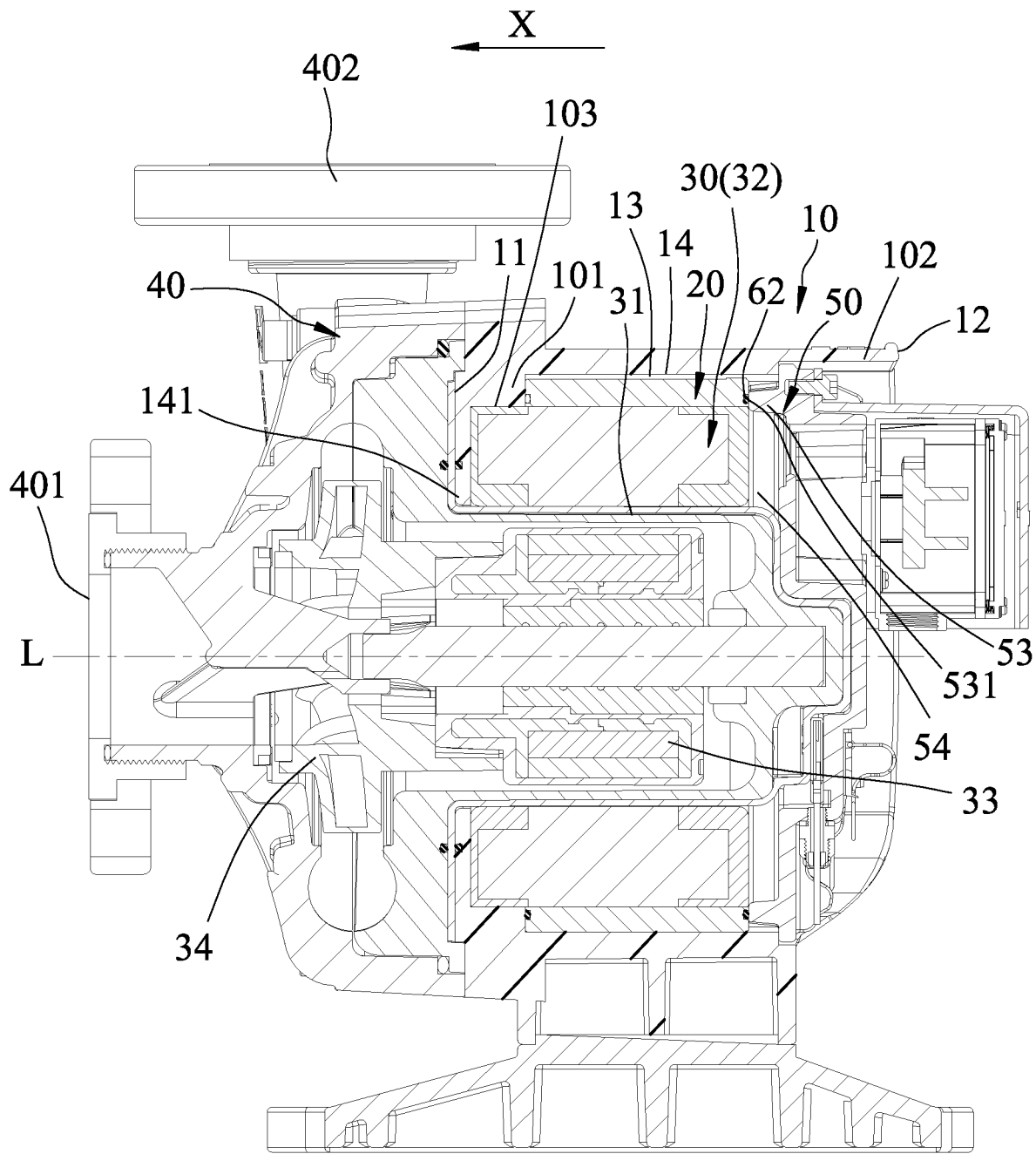
FIG. 2 is a sectional view of the embodiment.
Figure 3:
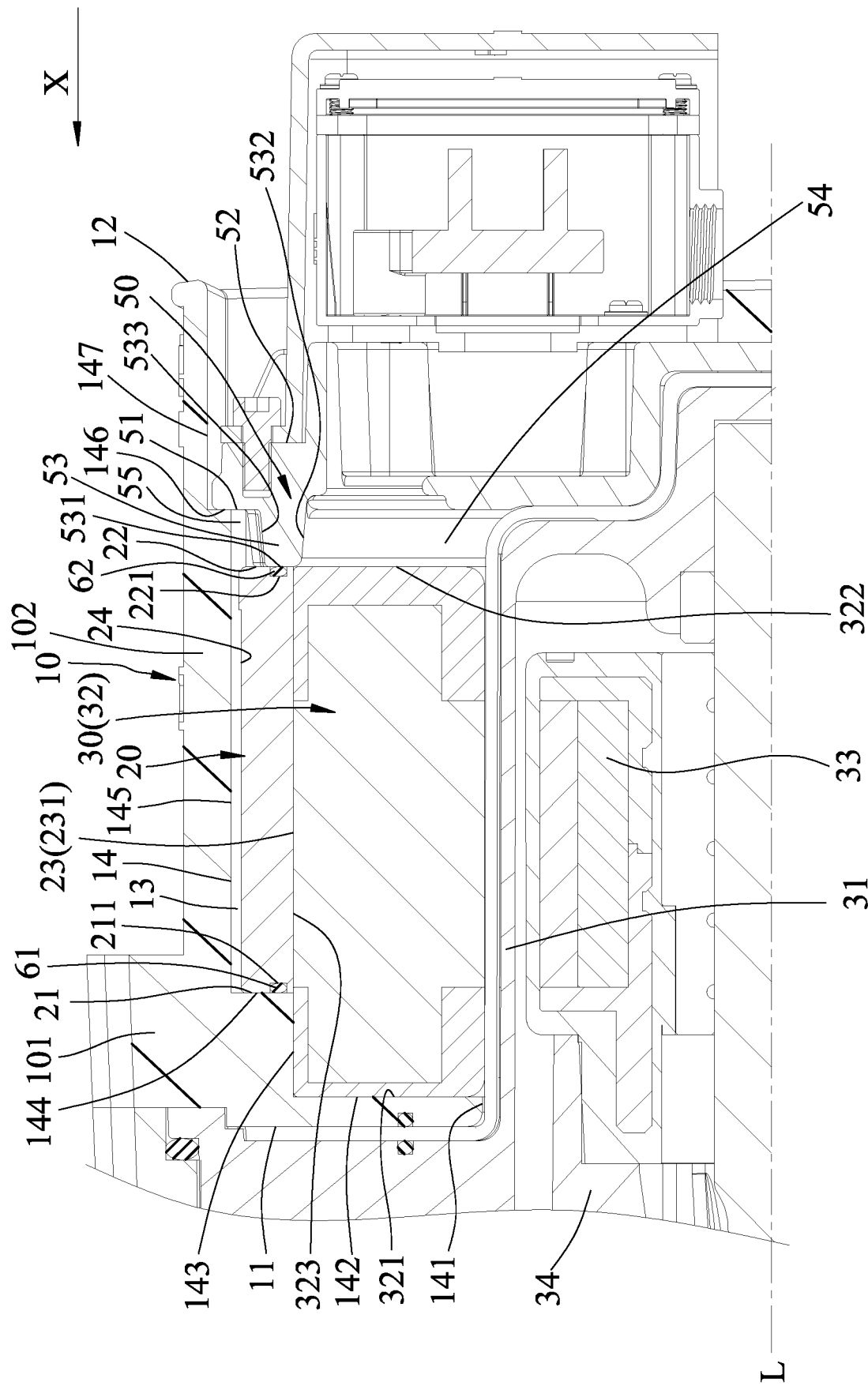
FIG. 3 is a fragmentary, enlarged view of FIG. 2.
Figure 4:
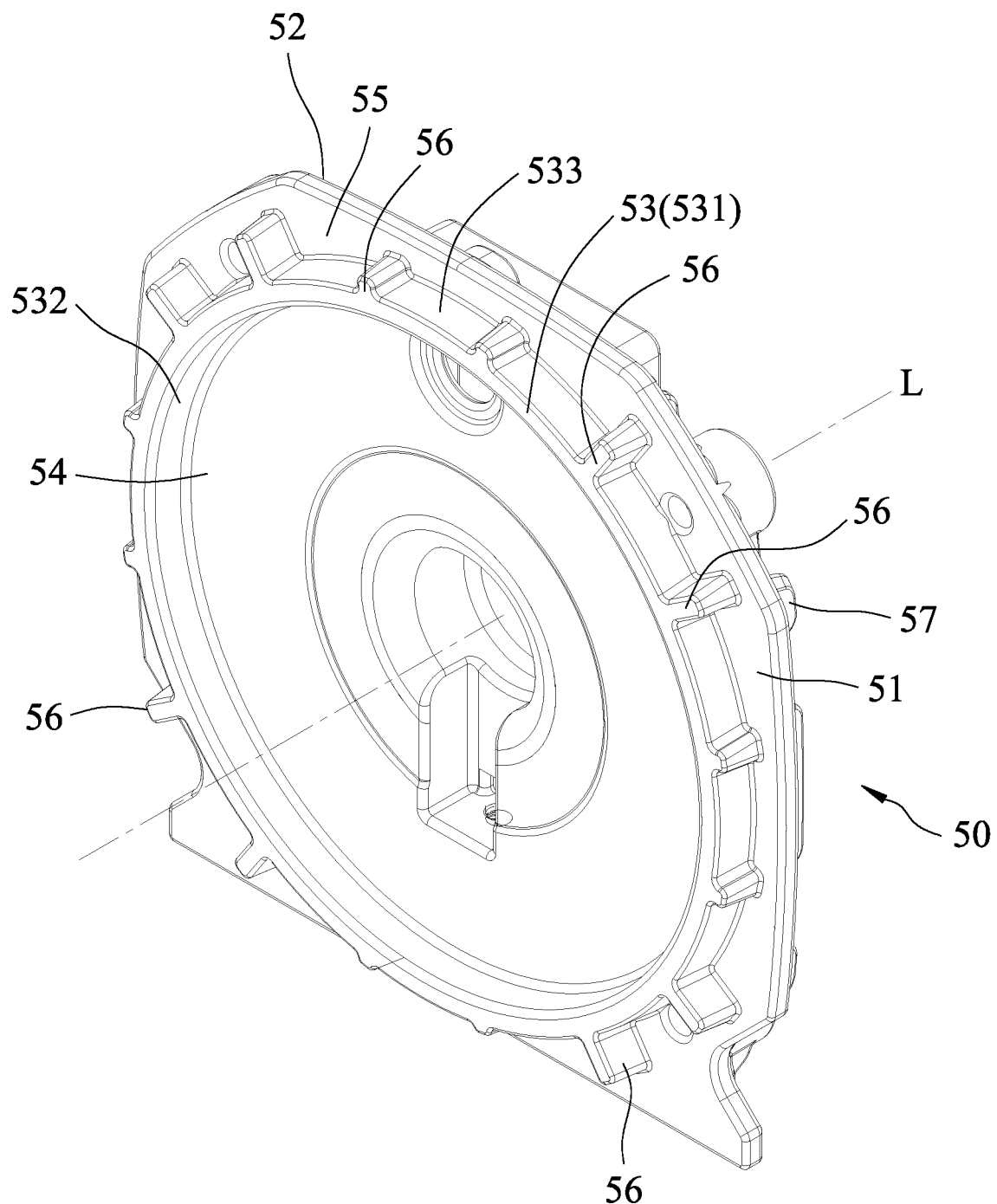
FIG. 4 is a perspective view of a main cover of the embodiment.

Referring to FIGS. 1 to 4, an embodiment of a canned motor device according to the disclosure includes a base 10, a fixed seat 20, a motor unit 30, a motor cover 40, a main cover 50 and two leak-proof members 61, 62.

The base 10 is made of a plastic material and is formed in a shape of a hollow cylinder that surrounds an axis (L). In this embodiment, the plastic material may be an engineering plastic with acid and alkali resistance, such as polypropylene (PP), glass fiber reinforced polypropylene (GFRPP), polyvinylidene difluoride (PVDF) and carbon fiber filled ethylene tetrafluoroethylene (CFRETFE). The base 10 includes a main body member 101 and a covering member 102 that are arranged in a direction (X) of the axis (L). The covering member 102 is connected to the main body member 101. The base 10 has a first end surface 11, a second end surface 12 and an inner base surface 14. The first end surface 11 is located on one side of the main body member 101 opposite to the covering member 102. The second end surface 12 is located on one side of the covering member 102 opposite to the first end surface 11 along the axis (L). The inner base surface 14 surrounds the axis (L), interconnects the first end surface 11 and the second end surface 12, and defines an accommodating space 13.

The inner base surface 14 of the base 10 has a stepped profile, and has a first axial segment 141, a second axial segment 143, a third axial segment 145, a fourth axial segment 147, a first abutting part 142, a second abutting part 144 and a third abutting part 146. The first axial segment 141 is connected to the first end surface 11. Each of the first axial segment 141, the second axial segment 143, the third axial segment 145 and the fourth axial segment 147 extends substantially in the direction (X) of the axis (L). Each of the first abutting part 142, the second abutting part 144 and the third abutting part 146 extends substantially perpendicularly to the axis (L). The first abutting part 142, the second abutting part 144 and the third abutting part 146 respectively interconnect the first axial segment 141 and the second axial segment 143, the second axial segment 143 and the third axial segment 145, and the third axial segment 145 and the fourth axial segment 147. The fourth axial segment 147 is connected to the second end surface 12. In this embodiment, the first abutting part 142, the second abutting part 144 and the third abutting part 146 face away from the first end surface 11.

The fixed seat 20 is made of an aluminum alloy, is formed in a shape of a hollow cylinder that surrounds the axis (L), is non-rotatably disposed in the accommodating space 13 of the base 10, and has a first seat surface 21, a second seat surface 22, an inner seat surface 23 and an outer seat surface 24. The first seat surface 21 abuts against the second abutting part 144 of the inner base surface 14. The second seat surface 22 is opposite to the first seat surface 21 along the axis (L). The inner seat surface 23 interconnects the first seat surface 21 and the second seat surface 22, surrounds the axis (L) and defines an inner space 231. The outer seat surface 24 surrounds and corresponds in position to the inner seat surface 23. Specifically, the outer seat surface 24 corresponds in position to the third axial segment 145 of the inner base surface 14. The second seat surface 22 is spaced apart from the third abutting part 146 of the inner base surface 14 in the direction (X) of the axis (L) and corresponds in position to the third axial segment 145 (i.e., the second seat surface 22 is closer to the second abutting part 144 than the third abutting part 146). Each of the first seat surface 21 and the second seat surface 22 is formed with a groove 211, 221 that surrounds the axis (L). The leak-proof members 61, 62 are respectively disposed in the groove 211 of the first seat surface 21 and the groove 221 of the second seat surface 22. The leak-proof member 61 in the groove 211 of the first seat surface 21 airtightly abuts against the second abutting part 144.

The motor unit 30 includes a case body 31, a stator 32, a rotor 33 and an impeller 34. The case body 31 is disposed on the base 10. The stator 32 is sleeved on the case body 31, is surrounded by the fixed seat 20, and has a first stator end surface 321, a second stator end surface 322 and an outer stator surface 323. The first stator end surface 321 abuts against the first abutting part 142 of the inner base surface 14. The second stator end surface 322 is opposite to the first stator end surface 321 along the axis (L). The outer stator surface 323 interconnects the first stator end surface 321 and the second stator end surface 322, and abuts against the second axial segment 143 of the inner base surface 14 and the inner seat surface 23 of the fixed seat 20 (i.e., the stator 32 is partly disposed in the inner space 231 of the fixed seat 20). The rotor 33 is disposed in the case body 31. The impeller 34 is connected to the rotor 33. Since the relevant features of this disclosure do not concern the specific configuration of the motor unit 30, further details of the same are omitted herein for the sake of brevity.

The motor cover 40 is disposed on the first end surface 11 of the base 10 and covers the impeller 34. Specifically, the motor cover 40 is fixedly mounted to the first end surface 11 by a plurality of screws, and has an intake opening 401 at an end thereof along the axis (L), and an exit opening 402 located at one side of the intake opening 401 that is the same as the impeller 34 and extending along a tangent line (not shown) to the outer periphery of the impeller 34.

Figure 5:
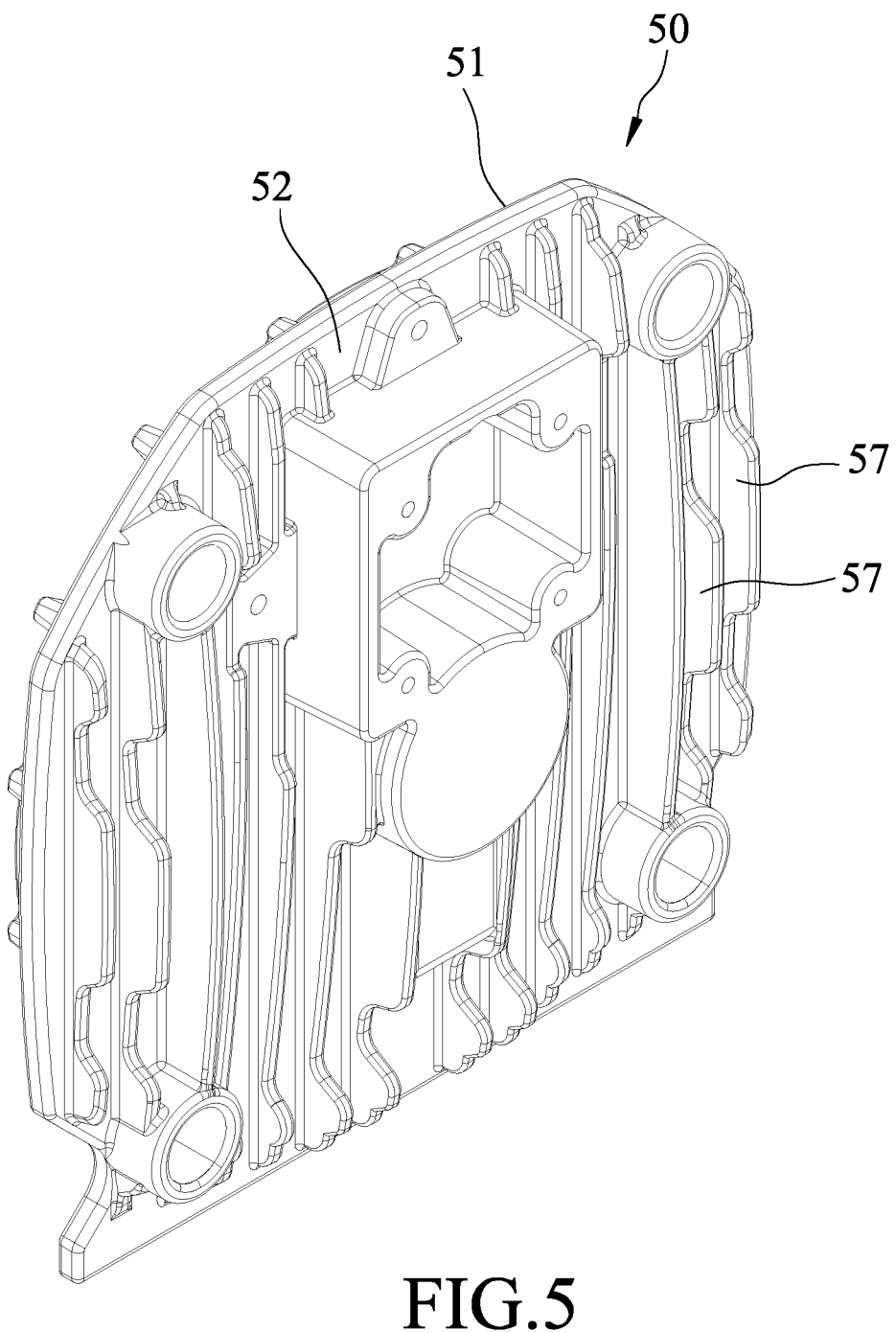
FIG. 5 is another perspective view of the main cover.

The main cover 50 is made of an aluminum alloy, is located at one side of the base 10 opposite to the motor cover 40 along the axis (L), is fixedly mounted to the base 10 by a plurality of screws, and has an inner surface 51, an outer surface 52, an annular protrusion 53, an inner heat-dissipating space 54, an outer heat-dissipating space 55, a plurality of cover protrusions 56 and a plurality of heat-dissipating fins 57 (see FIG. 5). The inner surface 51 and the outer surface 52 are respectively located at two opposite sides of the heat-dissipating cover 50 in the direction (X) of the axis (L). The inner surface 51 abuts against the third abutting part 146 of the inner base surface 14 of the base 10. The annular protrusion 53 protrudes from the inner surface 51 and is configured to be annular. The inner heat-dissipating space 54 is defined by the inner surface 51 and the annular protrusion 53, and is adjacent to the stator 32 of the motorrotor unit 30. Each of the heat-dissipating fins 57 protrudes from the outer surface 52 and away from the inner surface 51. Specifically, the annular protrusion 53 has an annular end surface 531, an inner annular surface 532 and an outer annular surface 533.

The annular end surface 531 is spaced apart from the inner surface 51 and airtightly abuts against the second seat surface 22 of the fixed seat 20. The inner annular surface 532 interconnects the annular end surface 531 and the inner surface 51 and is adjacent to the inner heat-dissipating space 54 (i.e., the inner heat-dissipating space 54 is defined by the inner surface 51 and the inner annular surface 532). The outer annular surface 533 is opposite to the inner annular surface 532, and interconnects the annular end surface 531 and the inner surface 51 (i.e., the outer annular surface 533 surrounds the inner annular surface 532). The outer heat-dissipating space 55 is defined by the inner surface 51 and the annular protrusion 53, and is adjacent to the outer annular surface 533 of the annular protrusion 53 (i.e., the outer heat-dissipating space 55 is defined by the inner surface 51 and the outer annular surface 533). Each of the cover protrusions 56 protrudes from the outer annular surface 533 into the outer heat-dissipating space 55, and is connected to the inner surface 51. The cover protrusions 56 are angularly spaced apart from each other about the axis (L) and extend radially with respect to the axis (L). The annular end surface 531 tightly abuts against the leak-proof member 62 in a manner that the leak-proof member 62 is firmly pressed into the groove 221 of the fixed seat 20 by the annular end surface 531 so that the leak-proof member 62 is airtightly clamped between the fixed seat 20 and the annular end surface 531 (i.e., via the leak-proof member 62, the main cover 50 airtightly abuts against the second seat surface 22 of the fixed seat 20). The main cover 50 corresponds in position to the fourth axial segment 147 of the inner base surface 14 and is surrounded by the covering member 102 (i.e., the main cover 50 is located in the base 10). The inner surface 51 abuts against one end of the case body 31 of the motor unit 30.

In the following description, the advantages provided by the structures of the embodiment of the canned motor device of the disclosure are described.

When the stator 32 of the motor unit 30 is energized, the rotor 33 of the motor unit 30 is driven by the stator 32 to rotate and to further drive the impeller 34 of the motor unit 30 to co-rotate so that the embodiment may pump liquid in a manner that the liquid is moved into the canned motor device through the intake opening 401 and are moved toward the exit opening 402 by the impeller 34 to exit the canned motor device through the exit opening 402.

When the motor unit 30 is in operation, heat is generated by the stator 32. By virtue of the inner heat-dissipating space 54 of the main cover 50 being adjacent to the stator 32, the heat is transferred to the main cover 50 through the inner heat-dissipating space 54, and then the heat is dissipated to the external environment through the heat-dissipating fins 57 of the main cover 50. Because the inner heat-dissipating space 54 is defined by the inner surface 51 and the annular protrusion 53 of the main cover 50, the main cover 50 has a relatively large surface area (i.e., the inner surface 51 and the inner annular surface 532) for the heat to be transferred from the inner heat-dissipating space 54 to the main cover 50. Therefore, heat-dissipation efficiency of the embodiment is relatively high, which may prolong the service life of the motor unit 30.

Furthermore, by virtue of the cover protrusions 56 of the main cover 50 protruding from the outer annular surface 533 of the annular protrusion 53 into the outer heat-dissipating space 55 of the main cover 50, an assembly of the cover protrusions 56 and the annular protrusion 53 has a relatively large surface area to dissipate the heat to the outer heat-dissipating space 55. That is to say, the heat is transferred to the main cover 50 not only through the inner heat-dissipating space 54 but also through the outer heat-dissipating space 55, so that the heat-dissipation efficiency of the embodiment is further enhanced. In addition, by virtue of the annular end surface 531 of the annular protrusion 53 airtightly abutting against the second seat surface 22 of the fixed seat 20, and by virtue of the cover protrusions 56, the fixed seat 20 is firmly disposed in the base 10. That is to say, the base 10 and the main cover 50 may cooperatively prevent the fixed seat 20 from moving in the direction (X) of the axis (L). Therefore, stability of the motor unit 30 is enhanced so that the motor unit 30 may perform more smoothly when energized, or when in operation. In one embodiment, the cover protrusions 56 are in contact with the fixed seat 20 to increase contact area between the main cover 50 and the fixed seat 20, and to reinforce the connection between the main cover 50 and the fixed seat 20.

Moreover, by virtue of the leak-proof member 62 being airtightly clamped between the fixed seat 20 and the annular end surface 531 of the annular protrusion 53 of the main cover 50, and by virtue of the annular end surface 531 airtightly abutting against the second seat surface 22 of the fixed seat 20, the embodiment achieves a leakproof effect.

In addition, in comparison with a cover that does not have an outer heat-dissipating space (i.e., a cover that has an inner heat-dissipating space only surrounded by a solid structure of the cover), by virtue of the configuration of the outer heat-dissipating space 55 and the cover protrusions 56, the main cover 50 may be made with less material. Consequently, the weight of the main cover 50 may be reduced so that the embodiment may be lightweight.

Overall, the canned motor device of the disclosure offers a design that is easy to assemble while providing enhanced heat-dissipation efficiency.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A canned motor device comprising:
    a base formed in a shape of a hollow cylinder that surrounds an axis, and defining an accommodating space;
    a fixed seat formed in a shape of a hollow cylinder that surrounds the axis, and disposed in said accommodating space;
    a motor unit including
        a case body that is disposed on said base,
        a stator that is sleeved on said case body and that is surrounded by said fixed seat,
        a rotor that is disposed in said case body, and
        an impeller that is connected to said rotor;
    a motor cover disposed on said base and covering said impeller; and
    a main cover located at one side of said base opposite to said motor cover along the axis, and having
        an inner surface that abuts against said base,
        an annular protrusion that protrudes from said inner surface, and that has an annular end surface spaced apart from said inner surface and airtightly abutting against said fixed seat, and
        an inner heat-dissipating space that is defined by said inner surface and said annular protrusion, and that is adjacent to said stator of said motor unit;
    wherein said annular protrusion of said main cover further has
        an inner annular surface interconnecting said annular end surface and said inner surface of said main cover, and adjacent to said inner heat-dissipating space of said main cover, and
        an outer annular surface opposite to said inner annular surface, and interconnecting said annular end surface and said inner surface; and
    wherein said main cover further has
        an outer heat-dissipating space defined by said inner surface and said annular protrusion, and adjacent to said outer annular surface of said annular protrusion, and
        a plurality of cover protrusions each of which protrudes from said outer annular surface and is connected to said inner surface.

2. The canned motor device as claimed in claim 1, wherein said cover protrusions are angularly spaced apart from each other about the axis and extend radially about the axis.

3. The canned motor device as claimed in claim 2, further comprising a leak-proof member that is airtightly clamped between said fixed seat and said annular end surface of said annular protrusion of said main cover.

4. The canned motor device as claimed in claim 1, further comprising a leak-proof member that is airtightly clamped between said fixed seat and said annular end surface of said annular protrusion of said main cover.

\* \* \* \* \*